Dec. 11, 1923.

D. J. HAYES

RICE HULLER

Filed March 1, 1922

INVENTOR
Daniel J. Hayes
BY
HIS ATTORNEYS

Patented Dec. 11, 1923.

1,477,262

UNITED STATES PATENT OFFICE.

DANIEL J. HAYES, OF WOODHAVEN, NEW YORK.

RICE HULLER.

Application filed March 1, 1922. Serial No. 540,108.

*To all whom it may concern:*

Be it known that I, DANIEL J. HAYES, a citizen of the United States, residing at Woodhaven, county of Queens, city and State of New York, have invented an Improvement in Rice Hullers, of which the following is a specification.

This invention relates to a machine for hulling rice. So far as I am aware, it has been customary heretofore to employ various types of machines in preparing rice for the market. In many instances separate machines are employed for removing the husks, removing the bran or yellow outer coating and removing the skin or inner coating and polishing the rice. The object of my invention is the provision of an apparatus in which the rice as taken from the field as paddy is treated by removing the husks, the bran or yellow outer skin and also the inner skin and polishing the rice to any desired extent without in any manner injuring the same. This is accomplished largely through the use of a cylinder so constructed as to include an abrasive surface or surfaces coacting with the cylindrical casing in which the same is placed, and adjustable devices for regulating the extent or area of the spaces through which the rice in its various stages of cleansing is caused to pass. The apparatus made in accordance with my invention also includes a construction in which the cylindrical casing is removably mounted in the frame of the machine and the cylinder is removably connected to suitable shafts so as to be interchangeable, together with a novel manner of securing a screen in the under or lower side of the cylinder, and devices by which the husks and bran may be separated and removed from the machine independently of the rice. Furthermore the apparatus made in accordance with my present invention may be either manually operated or operated by power, all of which will be hereinafter more particularly described.

Figure 1:
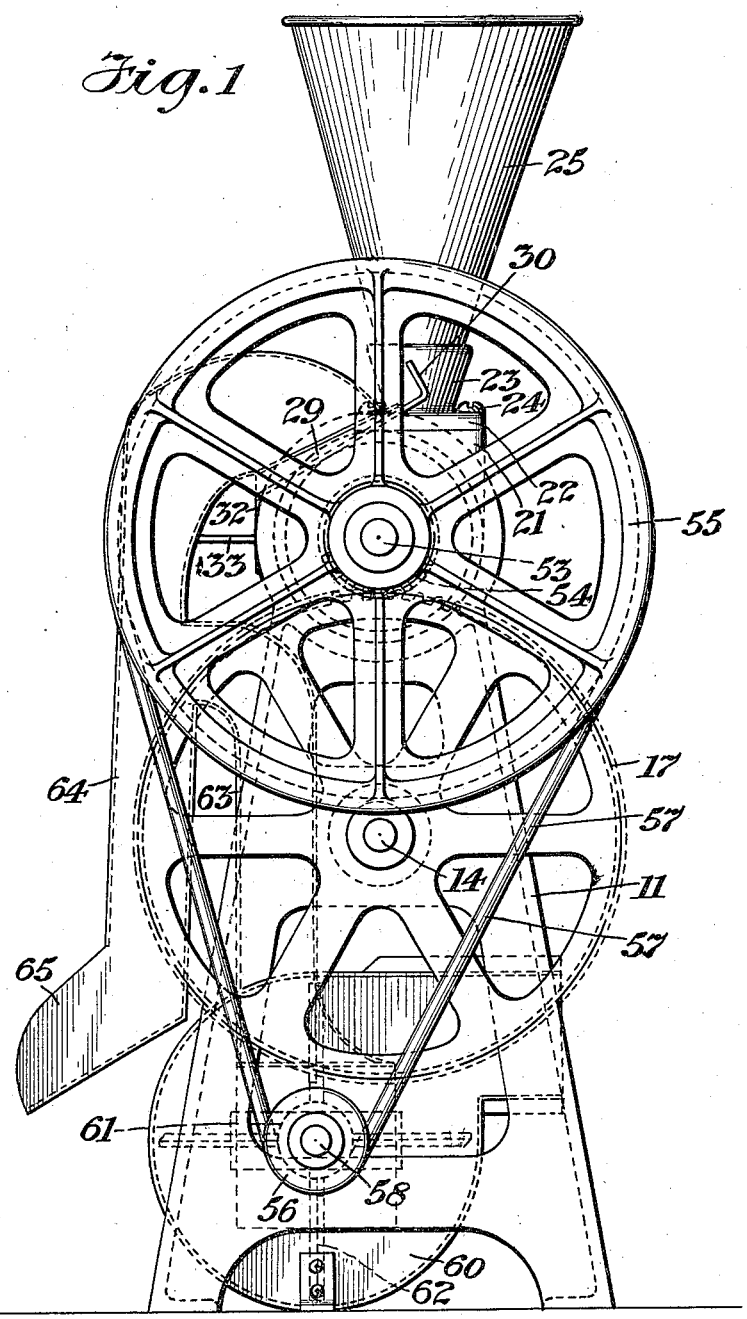
Fig. 1 is an end elevation of a rice huller made in accordance with my invention.
Figure 2:
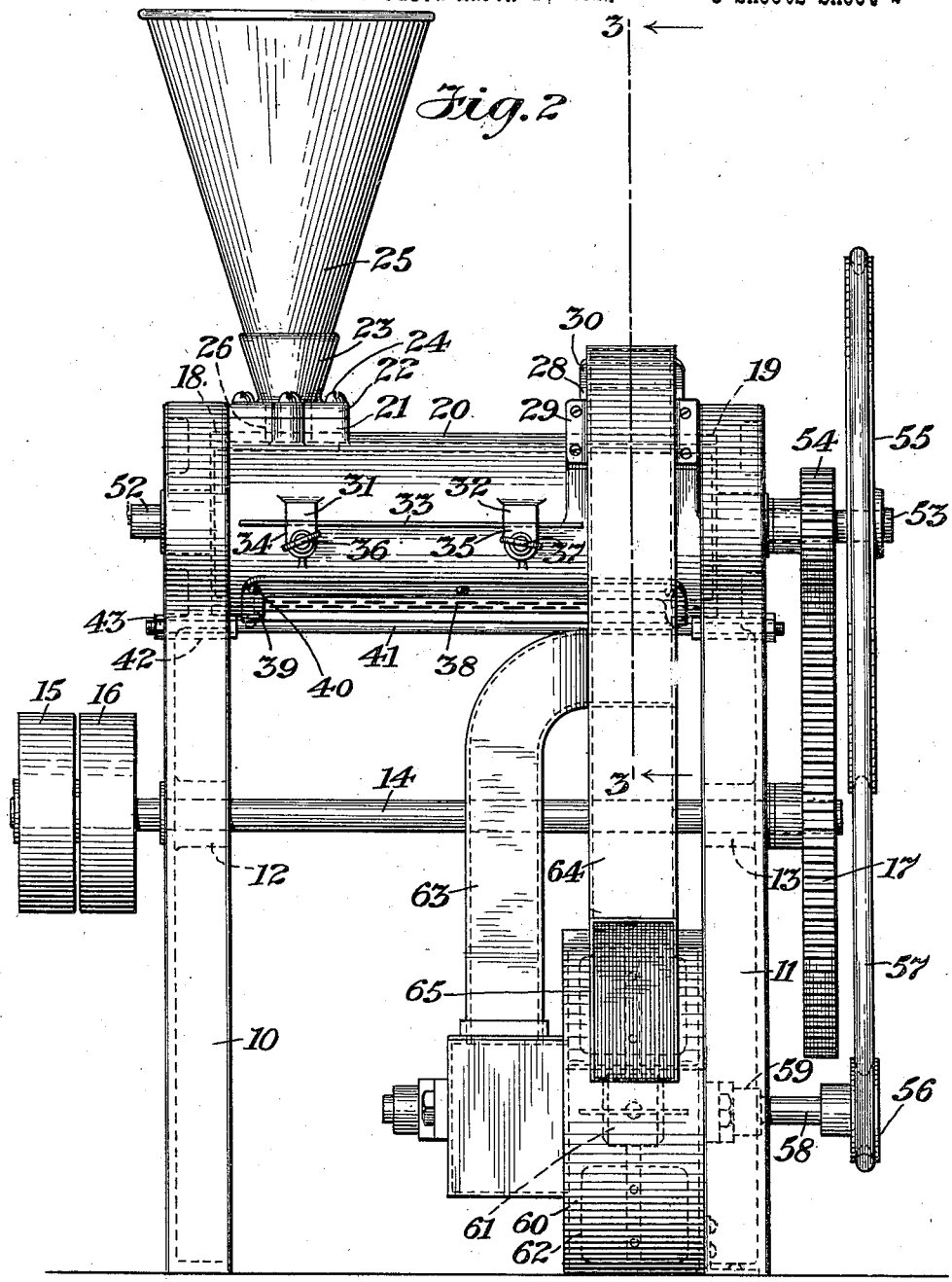
Fig. 2 is a front elevation of the same.
Figure 3:
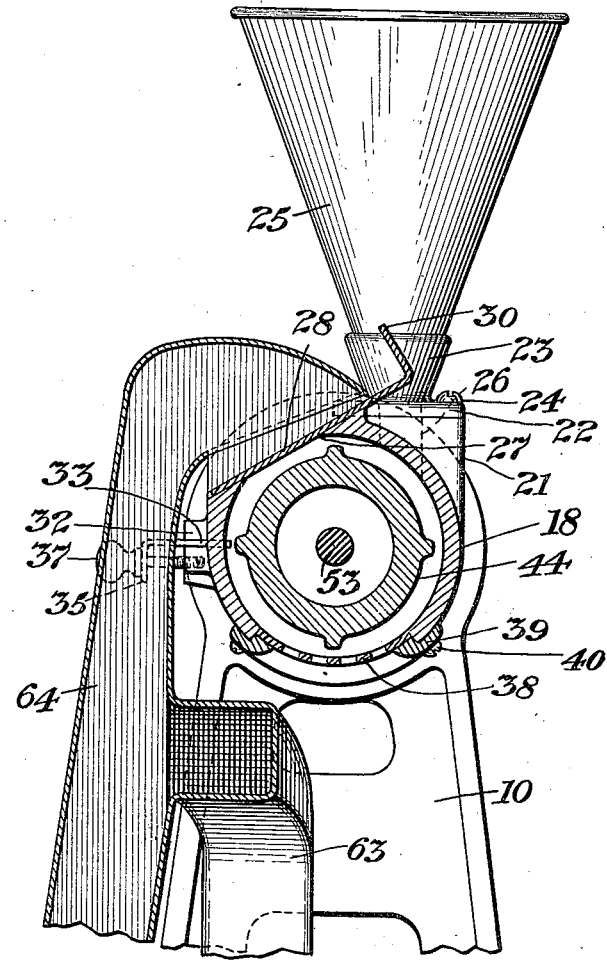
Fig. 3 is a cross section on line 3—3, Fig. 2.
Figure 4:
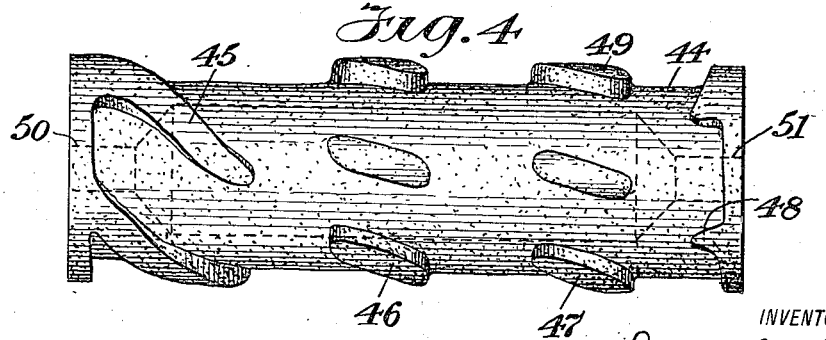
Fig. 4 is an elevation on a slightly enlarged scale illustrating the form of abrasive cylinder employed.

Referring to the drawings, the apparatus made in accordance with this invention comprises legs or frame members 10 and 11 suitably spaced and adapted to be connected to a foundation of any desired character. In suitable positions in the legs 10 and 11 there are bearings 12 and 13 in which a power or drive shaft 14 is journaled. On this shaft 14 outside of the leg 10 there are pulleys 15 and 16, one of which may be an idler and the other a drive pulley for turning the shaft. On the opposite end of the shaft 14 on the outside of the leg 11 there is suitably secured a gear 17.

In the inner side of the leg 10 adjacent the upper end thereof there is a socket or recess 18, and in a corresponding position in the leg 11 a similar socket or recess 19. The apparatus includes a cylindrical casing 20, one end of which is closed and adapted to be received in the recess or socket 19 in the leg 11 and the other end of which is open and adapted to be received in the recess or socket 18 in the leg 10. Adjacent the open end of the casing the same is provided with a boss 21 to which a base 22 of a flange socket 23 is secured by means of screws 24 or otherwise, the flange socket 23 being adapted to receive a hopper 25. It will be understood, of course, that the flange socket 23 and hopper 25 may be made as an integral structure and that these members communicate by way of an inlet port 26 with the interior of the casing 20. At the opposite end of the casing there is a discharge opening 27 fitted with a gate 28 which preferably operates in lugs 29 and may be placed in any desired position by means of a handle 30 so as to regulate and control the extent to which the discharge opening is uncovered for the discharge of the rice from the apparatus.

In suitable positions on the side of the casing there are spaced lugs 31 and 32 having recesses therein to receive a blade 33 which also extends through a slot provided therefor in the casing, and in positions spaced correspondingly with the lugs 31 and 32 is fitted with ears 34 and 35 preferably turned at right angles thereto and provided with adjusting screws 36 and 37. These adjusting screws are preferably swiveled in the ears and extend into taps provided therefor in the lugs 31 and 32 beneath the blade 33 so that by turning the adjusting screws the extent to which the inner edge of the blade projects beyond the inner surface of the casing may be regulated and determined.

In another portion of the casing and preferably in the underside or bottom thereof there is an opening in which there is fitted a screen or perforated circular plate 38 by which the husks and bran or portions thereof are permitted to leave the casing. This screen is secured in position in the cylinder by means of a rectangular frame 39 adapted to conform to the opening in the casing in which the screen is placed and to project slightly into the same, with the outer portions of the frame lying against the outer surface of the casing and fixed therein by means of screws 40 or otherwise.

The legs 10 and 11 with the casing in position therein are normally fixed in their relationship to one another by means of rods 41 passing through bearings 42 provded therefor in the legs and held in place by nuts 43 or otherwise.

Within the casing 20 I employ a cylinder 44. This is preferably made of iron or steel and is provided with ribs 45 at the inlet end of the cylinder, a plurality of lugs 46 and 47 in sets between the extremities of the cylinder and relatively short ribs 48 at the discharge end of the cylinder. The surfaces of these ribs are preferably made of abrasive material, such for instance as carborundum which is cast with the metal in making the cylinder. The ribs 45 are at a suitable inclination and preferably so curved as to feed the rice forward as the same is fed to the apparatus. The lugs 46 and 47 are also placed obliquely to the axis of the cylinder so that the edges thereof tend to feed the rice forward while the relatively short ribs 48 are so constructed as to have the tendency of throwing the rice backward against itself before reaching the discharge opening 27. The ends of the cylinder are so constructed as to include bearings or sockets 50 and 51 adapted respectively to receive the shafts 52 and 53 which are journaled in bearings provided therefor in the legs 10 and 11.

Exteriorly of the leg 11 a shaft 53 is fitted with a gear 54 meshing with the gear 17 and a pulley 55. The pulley 55 is employed to drive a pulley 56 by means of a belt 57, the pulley 56 being mounted on a shaft 58 which is journalled in bearings 59 provided therefor in the leg 11. This shaft 58 is suitably connected to the shaft of a blower 60, the hub of which as indicated at 61 carries the blower blades or vanes 62 for creating the necessary suction to separate the husks and bran from the rice in the operation of the apparatus. The suction end of the blower is connected to a conduit 63 which at its upper end is connected with a chute 64. The upper end of the chute 64 encloses the discharge opening 27 of the casing 20 and at its lower end is fitted with a chute 65 for discharging the rice from the apparatus.

The conveyor cylinder 44 is preferably made of iron or steel and the abrasive surfaces of the ribs and lugs thereon are preferably made of carborundum, although of course other materials may be used for the construction of this part of the apparatus. Furthermore the construction is such that the abrasive material is preferably made an integral part of the conveyor cylinder, although manifestly it may be secured to the desired surfaces in any other suitable manner. It will also be apparent that in the use of carborundum, for example, various grades of the same may be employed. For example the carborundum used in the ribs 45 may be relatively coarse, while that used in the short ribs 48 may be relatively fine, and that used in the ribs 46 and 47 may be of intermediate grades. On the other hand, as will furthermore be understood the carborundum employed in any particular cylinder may be all of the same grade and cylinders made in this manner may be interchangeably employed in the use of the apparatus, the construction being such that the casing is readily removable to interchange or exchange a conveyor cylinder when the same becomes necessary or desirable.

In using the apparatus as hereinbefore described, rice in any condition may be hulled and suitably prepared for the market without being necessary to pass the same through any other apparatus. The rice is supplied to the machine through the hopper 25 and the conveyor cylinder is revolved either manually or from a suitable source of power through the drive shaft 14 and the gears 17 and 54. The husks of the rice, when paddy is being handled, for example, are removed by the ribs 45 as the rice is conveyed forwardly by the same and as the rice is fed forwardly the bran and the inner skin are removed by the abrasive surfaces of the husks 46 and 47 and the rice is polished to a suitable extent through the adjustment of the position of the inner edge of the blade 33. The greater part of the husks and the bran are removed by way of the screen 38 and as will be understood that portion of the bran and husks which may be delivered with the rice from the machine are separated by means of the draft from the blower by way of the conduit 63, while the rice in its prepared conditon is delivered by way of the chute 64. It is furthermore to be noted that because of the construction of the casing having one end thereof closed and the other open, it will be substantially impossible for any of the rice to escape and consequently none of the rice will be lost in the hulling operation.

I claim as my invention:

1. A rice hulling machine comprising frame members each having a socket therein, a casing open at one end and closed at the other, the casing being supported in the said sockets of the frame members, a cylinder within the casing, the cylinder having a series of inclined ribs at one end for advancing material as supplied to the cylinder, a series of oppositely disposed ribs at the other end, and a plurality of spaced obliquely placed ribs intermediate of the aforesaid ribs, and means for revolving the cylinder.

2. A rice hulling machine comprising oppositely disposed frame members each having a socket and a bearing therein, a casing at one end and closed at the other end and having an inlet opening adjacent the open end and a discharge opening adjacent the closed end, the said casing being mounted in the sockets in the frame members, a cylinder having a plurality of inclined ribs at the inlet end of the opening for advancing material as supplied thereto, a series of oppositely disposed ribs at the other end thereof for moving the material toward the discharge opening, and a plurality of spaced obliquely placed ribs intermediate of the aforesaid ribs and having surfaces of abrasive material, and means for revolving the cylinder.

3. A rice hulling machine comprising oppositely disposed frame members each having a socket and a bearing therein, a casing open at one end and closed at the other end and having an inlet opening adjacent the open end and a discharge opening adjacent the closed end, the ends of the casing being received in the said sockets in the frame members, a cylinder, shafts mounted in the ends of the cylinder to be journaled in the said bearings in the frame members, the cylinder having a series of inclined ribs at the inlet end of the casing for advancing material as supplied to the cylinder, a series of oppositely disposed rigs at the other end thereof for moving the material toward the discharge opening, a plurality of spaced obliquely placed ribs intermediate of the aforesaid ribs, and means for revolving the cylinder.

4. A rice hulling machine comprising oppositely disposed frame members each having a socket and a bearing therein, a casing open at one end and closed at the other end and having an inlet opening adjacent the open end and a discharge opening adjacent the closed end, the ends of the casing being received in the said sockets in the frame members, a cylinder, shafts mounted in the ends of the cylinder to be journaled in the said bearings in the frame members, curved ribs at the inlet end of the cylinder having an abrasive surface for removing the husks from the rice and advancing the same along the cylinder, a plurality of ribs placed obliquely on the cylinder and having abrasive surfaces for removing the bran and polishing the rice, and a plurality of oppositely disposed ribs at the opposite end of the cylinder tending to move the rice toward the discharge opening, and means for revolving the cylinder.

5. A rice hulling machine comprising oppositely disposed frame members each having a socket and a bearing therein, a casing open at one end and closed at the other end and having an inlet opening adjacent the open end and a discharge opening adjacent the closed end, the ends of the casing being received in the said sockets in the frame members, a cylinder, shafts mounted in the ends of the cylinder to be journaled in the said bearings in the frame members, curved ribs at the inlet end of the cylinder having an abrasive surface for removing the husks from the rice and advancing the same along the cylinder, a plurality of ribs placed obliquely on the cylinder and having abrasive surfaces for removing the bran and polishing the rice, a plurality of oppositely disposed ribs at the opposite end of the cylinder tending to move the rice toward the discharge opening, a blade passing through a slot provided therefor in the wall of the casing and adjustable to position to determine the relative distance between the inner edge of the blade and the surfaces of the said ribs on the cylinder, and means for revolving the cylinder.

Signed by me this 9th day of Feby., 1922

DANIEL J. HAYES.